C. E. MOSER.
SHOCK ABSORBING WHEEL FOR VEHICLES.
APPLICATION FILED DEC. 30, 1910.
1,073,508.
Patented Sept. 16, 1913.
3 SHEETS—SHEET 2.
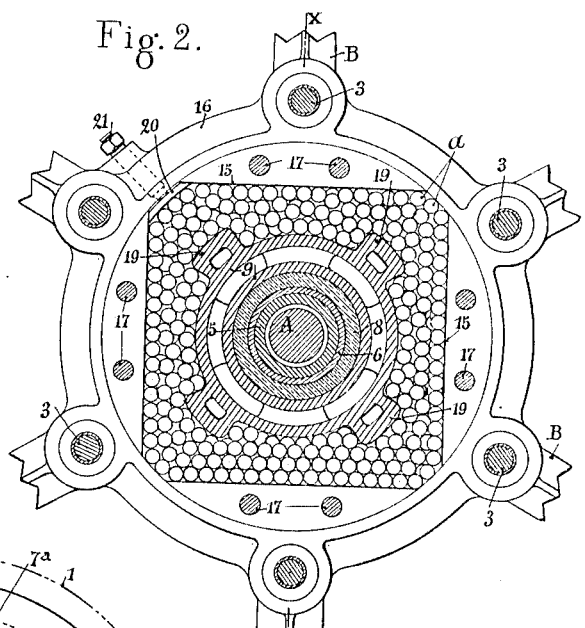
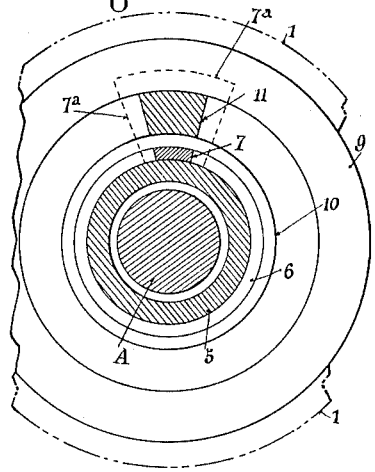
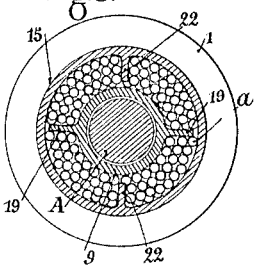
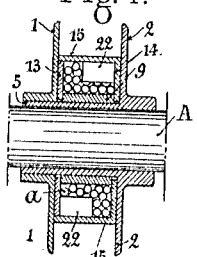
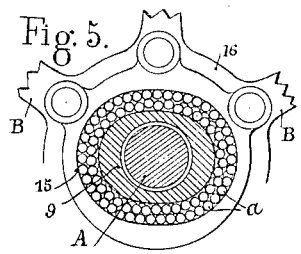
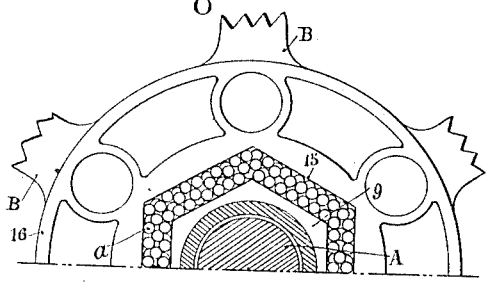
Witnesses
A. P. Connor
H C Hunsberger
Inventor
Charles. E. Moser
By B. Singer
Atty.

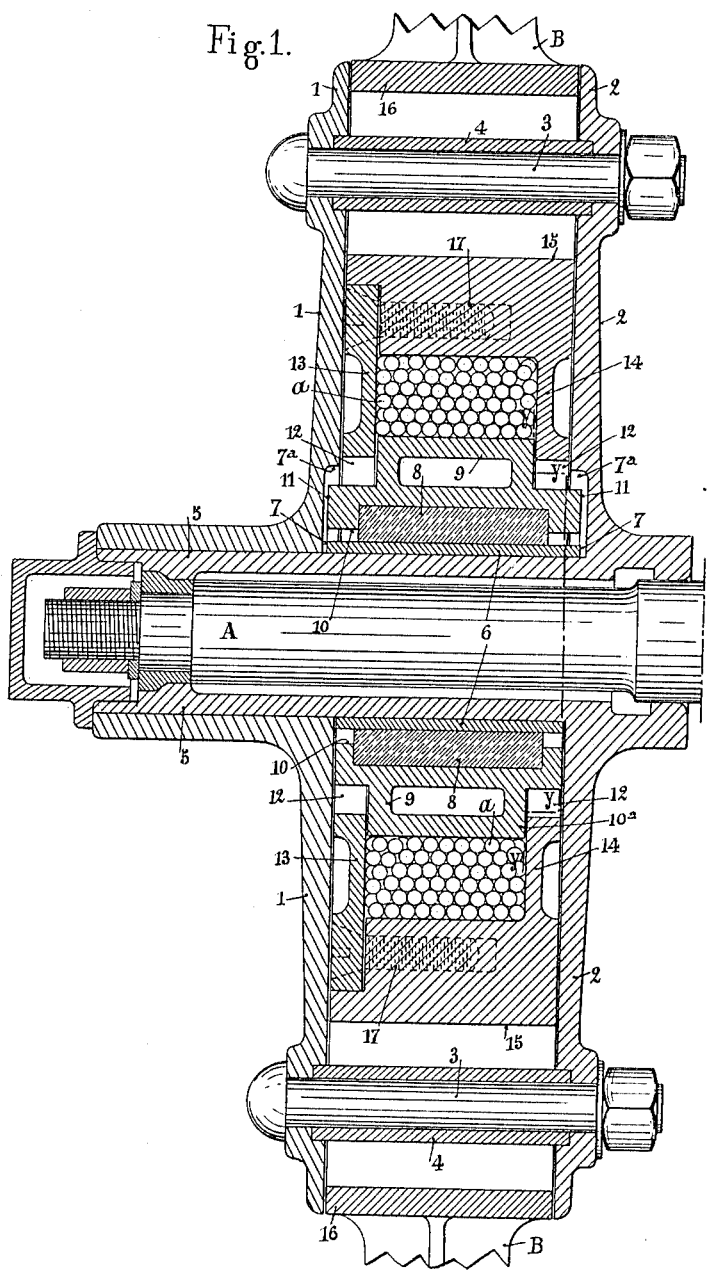

C. E. MOSER.
SHOCK ABSORBING WHEEL FOR VEHICLES.
APPLICATION FILED DEC. 30, 1910.

1,073,508.

Patented Sept. 16, 1913.

3 SHEETS—SHEET 3.

Witnesses
A. P. Connor
H C Hunsberger

Inventor
Charles E. Moser.
By B. Singer
Atty.

UNITED STATES PATENT OFFICE.

CHARLES EDWARD MOSER, OF BOULOGNE-SUR-SEINE, FRANCE.

SHOCK-ABSORBING WHEEL FOR VEHICLES.

1,073,508.  Specification of Letters Patent.  Patented Sept. 16, 1913.

Application filed December 30, 1910. Serial No. 600,132.

*To all whom it may concern:*

Be it known that I, CHARLES EDWARD MOSER, a citizen of the French Republic, residing at 14 Rue Thiers, Boulogne-sur-Seine, France, have invented certain new and useful Improvements in Shock-Absorbing Wheels for Vehicles, of which the following is a specification.

This invention has for its object a shock-absorbing wheel for road or railway vehicles, and consists in forming the shock absorber of spherical bodies or balls made of hard metal, and inclosed in displaceable chambers.

The characteristic feature of this shock-absorbing wheel is that the chambers in which the balls are contained are entirely filled with balls, that is to say, that all these balls are constantly tangential to one another, and that in consequence of the internal configuration of the chambers, which have either polyhedral sides, projections, ribs, or zigzags, the balls are carried around and forced to follow the rotary movement of the wheel.

This improved construction of wheel comprises one, two or more central movable concentric chambers inclosed between two parallel plates placed concentrically to its axle.

Figure 7:
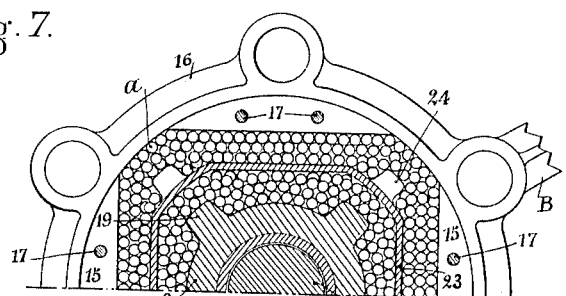
Figure 8:
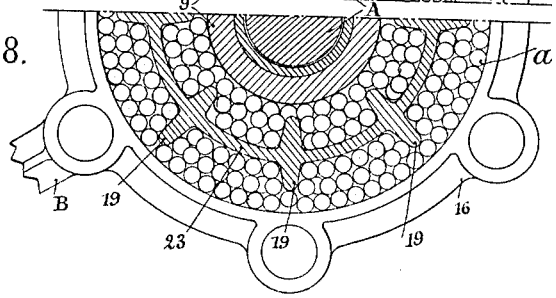
Figure 9:
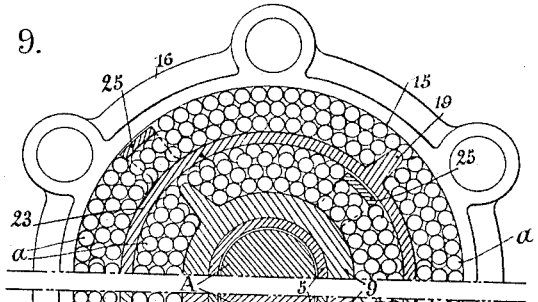
Figure 10:
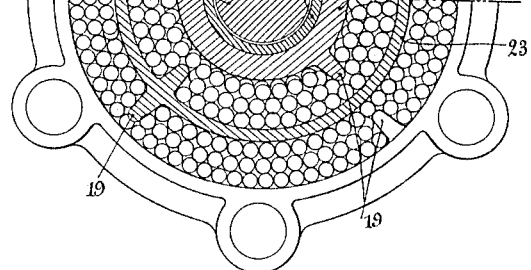

Figure 1 is a diametrical transverse sectional view through a wheel portion embodying my invention in which a polyhedral ball chamber is provided. Fig. 2 is a central vertical section through the device as disclosed in Fig. 1. Fig. 2ª is a sectional view on the lines *y—y* of Fig. 1. Fig. 3 is a transverse section through the hub portion of a wheel embodying a modification of my invention, in which a cylindrical ball chamber is provided with lugs or projections extending thereinto. Fig. 4 is a central vertical section through the hub as disclosed in Fig. 3. Fig. 5 is a view similar to Fig. 3 embodying a modification of my invention, an ovally formed ball chamber being provided. Fig. 6 is a transverse section through the hub portion of a wheel embodying a modification of my invention, and merely that portion at one side of the axis of symmetry being shown, a polyhedral ball chamber being provided. Fig. 7 is a view similar to Fig. 6 showing a modification of the form shown in Figs. 1 and 2. Fig. 8 is a view similar to Fig. 6 showing a modification of the form shown in Figs. 3 and 4. Fig. 9 is a view similar to Fig. 6 showing a further modification of the form shown in Figs. 3 and 4. Fig. 10 is a view similar to Fig. 6 showing a still further modification of the form as shown Figs. 3 and 4.

As shown in Figs. 1, 2 and 2ª, the wheel is formed of two parallel plates 1, 2 maintained at an invariable distance through the medium of bolts 3 furnished inside the plates with a sleeve 4 or with shoulders which keep the plates apart. The plate 2 is provided with a cylindrical sleeve or bush 5 having an internal flange which fits the reduced end of the axle A. Between these plates 1, 2 and on the bush or sleeve 5 is mounted a metal sleeve 6, which is provided over a portion of its circumference and on each side with a segmental extension or flange 7. Each extension 7 engages in a recess 7ª in the form of a grooved sector in each of the plates 1 and 2. These extensions 7 in coming in contact with the recess 7ª are thus forced to rotate with the plates. Surrounding the metal sleeve is a sleeve 8 made of india-rubber or other flexible material, or spiral or other easily compressible springs. On the resilient sleeve 8 which is easily compressible is carried a solid or hollow sleeve 9, which forms the inner wall of the ball-chamber. On the sleeve 9 are end flanges 10 having extensions 11, which engage in the recess 7ª, for the purpose of forcing the sleeve 9 to rotate with the plates 1 and 2. The flanges 10 do not extend inward to the sleeve 6, in order that it may be possible for the sleeve 9 to approach the axis of rotation by compressing the resilient sleeve 8. The sides of the flanges 10 serve for centering the sleeve 9 between the plates 1 and 2. In the annular empty spaces formed between the plates 1, 2, and the ends of the sleeve 9 the side cheeks 13 and 14 of the ball-chamber *a* slide. The cheek 14 forms part with a polyhedral casing or wall 15 placed concentrically to the axle A. The wall 15 forms part of the hub 16, inclosed between the plates 1 and 2, on which the spokes B of the wheel are arranged.

The cheeks 13 and 14 may be recessed on the outside as shown, for the purpose of lessening their friction against the inner faces of the plates 1 and 2. The cheek is firmly connected with the cheek 14 by stud bolts 17, which, if necessary, may serve for tightening up the balls, so as to lessen their mobility. All that is necessary for this purpose is to bring the two cheeks 13 and 14 more or less near together by screwing up the stud bolts 17 accordingly.

In the form of the invention illustrated in Figs. 1 and 2 the exterior of the ball-chamber has flat parts 15 and curvilinear parts 18. The sleeve 9 is provided on its periphery with ribs 19 which project into the ball-chamber $a$. The ribs 19 are intended to co-operate with the polyhedral walls 15 and 18 of the ball chamber, to assist the rotary movement of the mass of the balls under the influence of the rotation of the wheel. Opposite one or more of the curvilinear sides 18 and in the interior of the ball-chamber plates 20 may be arranged with adjusting screws 21 for operating on the plates to tighten the balls up more or less. As will be seen in this form of construction the axle A is supported by the hub 16 through the medium of the balls $a$ which entirely fill the displaceable central chamber. The result of this is that when the vehicle moves forward or backward there is a slight flexibility between the wheel rim and hub, and the wheel in running over the ground pushes the mass of the balls forward through the medium of the polyhedral sides 15 and 18 or of the ribs 19, and constantly carries the balls below the axle, that is to say to the place which receives the shock. The consequence is that the shocks arising from the unevenness of the road are produced against the body of the balls which they displace in the chamber at the expense of the radial mobility of the ball-chamber along the inner faces of the plates 1 and 2. The shocks, being absorbed by the displacement of the body of the balls, do not reach the axle A, which remains almost unaffected. The slight compressibility of the ring 8 reduces the severity of the shocks imparted to the balls.

In Figs. 3 and 4 the outer wall of the ball-chamber is cylindrical. This wall is provided with ribs 22, which extend over a portion of the height and of the width of the chamber, while the ribs 19 forming part with the sleeve 9 are arranged radially over a part of the height, and of the width of that chamber. These ribs force the balls to follow the movement of the wheel when rotating.

In Fig. 5 the sleeve 9 and the wall 15 of the ball-chamber are elliptical. There is no rib, the annular elliptical seating reserved for the balls $a$ being sufficient to force the balls to rotate with the wheel.

In Fig. 6 the sleeve 9 and outer wall 15 of the ball-chamber are polyhedral.

In Fig. 7 the sides of the ball chamber are similar to those in Fig. 2 but an intermediate polyhedral ring 23 with external ribs 24 is arranged in the middle of the ball chamber.

In Fig. 8 the two concentric ball-chambers are only provided with radial projections 19, of different length on the intermediate ring 23 forming the cylindrical separating surface.

In Fig. 9 there are two concentric ball chambers. The inner chamber surrounds the sleeve 9 provided with the ribs 19, and cut-out ribs 25 under which the balls $a$ pass. The concentric outer ball-chamber is provided with a circumferential cylindrical casing, the intermediate ring 23 forming its bottom, and the circumferential casing of the central chamber being furnished with projecting ribs 19, and excised ribs 25 of the same type.

In Fig. 10 the two concentric ball chambers are provided with radial projecting ribs 19, extending over a part of the height of the chamber.

I claim:

1. A shock absorbing wheel comprising in combination, a hub and a tread portion movable with respect to each other, resilient means carried by and peripherally of said hub, a collar mounted upon said resilient means and movable with said hub circumferentially but free to move toward and from the axis of said hub, a second collar spaced apart from said first mentioned collar and carried by said tread portion, a body consisting of a plurality of balls in tangential relation to each other interposed between said collars, and means for confining said body of balls within the chamber formed by such means and the said collars, the said first mentioned collars being peripherally irregular to force the said body of balls to follow substantially the rotary movement imparted to the wheel to transmit movement between the hub and tread portion of the wheel with flexibility therebetween, substantially as and for the purpose set forth.

2. A shock absorbing wheel comprising in combination, a hub and a tread portion movable with respect to each other, resilient means carried by and peripherally of said hub, a collar mounted upon said resilient means and movable with said hub circumferentially but free to move toward or from the axis of said hub, a second collar spaced apart from said first mentioned collar and carried by said tread portion, a body consisting of a plurality of balls in tangential relation to each other interposed between said collars, and means for confining said body of balls within the chamber formed by said means and the said collars, the said second mentioned collar being peripherally irregular to force the said body of balls to follow substantially the rotary movement imparted to the wheels, to transmit movement between the hub and tread portions of the wheel with flexibility therebetween, substantially as and for the purpose set forth.

3. A shock absorbing wheel comprising in combination, a hub and a tread portion movable with respect to each other, resilient means carried by and peripherally of said hub, a collar mounted upon said resilient means and movable with said hub circumferentially, but free to move toward or from the axis of said hub, a second collar spaced apart from said first mentioned collar and carried by said tread portion, a body consisting of a plurality of balls in tangential relation to each other interposed between said collars, and means for confining said body of balls within a chamber formed by said means and said collars, the said first and second mentioned collars being peripherally irregular to force the said body of balls to follow substantially the rotary movement imparted to the wheel, to transmit movement between the hub and tread portions of the wheel with flexibility therebetween, substantially as and for the purpose set forth.

4. A shock absorbing wheel comprising in combination, a hub and a tread portion movable with respect to each other, resilient means carried by and peripherally of said hub, a collar mounted upon said resilient means and movable with said hub circumferentially, but free to move toward or from the axis of said hub, a second collar spaced apart from said first mentioned collar and carried by said tread portion, a body consisting of a plurality of balls in tangential relation to each other interposed between said collars, means for confining said body of balls within the chamber formed by said means and the said collars, means for adjusting the relative tangential contact of said balls, the said first mentioned collar being peripherally irregular to force the said body of balls to follow substantially the rotary movement imparted to the wheel, to transmit movement between the hub and tread portions of the wheel with flexibility therebetween, substantially as and for the purpose set forth.

5. A shock absorbing wheel comprising in combination, a hub and a tread portion movable with respect to each other, resilient means carried by and peripherally of said hub, a collar mounted upon said resilient means and movable with said hub circumferentially, but free to move toward or from the axis of said hub, a second collar spaced apart from said first mentioned collar and carried by said tread portion, a body consisting of a plurality of balls in tangential relation to each other interposed between said collars, means for confining said body of balls within the chamber formed by said means and the said collars, and means for adjusting the relative tangential contact of the said balls, the said second mentioned collar being peripherally irregular to force the said body of balls to follow substantially the rotary movement imparted to the wheel, to transmit movement between the hub and tread portions of the wheel with flexibility therebetween, substantially as and for the purpose set forth.

6. A shock absorbing wheel comprising in combination, a hub and a tread portion movable with respect to each other, resilient means carried by and peripherally of said hub, a collar mounted upon said resilient means and movable with said hub circumferentially, but free to move toward or from the axis of said hub, a second collar spaced apart from said first mentioned collar and carried by said tread portion, a body consisting of a plurality of balls in tangential relation to each other interposed between said collars, means for confining said body of balls within the chamber formed by said means and the said collar, and means for adjusting the relative tangential contact of the said balls, the said first and second mentioned collars being peripherally irregular to force the said body of balls to follow substantially the rotary movement imparted to the wheel, to transmit movement between the hub and tread portions of the wheel with flexibility therebetween, substantially as and for the purpose set forth.

In testimony whereof I have affixed my signature, in presence of two witnesses.

CHARLES EDWARD MOSER.

Witnesses:
ALBERT MAULVAULT,
H. C. COXE.

---

Copies of this patent may be obtained for five cents each, by addressing the "Commissioner of Patents, Washington, D. C."